(12) United States Patent
Iwamoto

(10) Patent No.: US 7,610,538 B2
(45) Date of Patent: Oct. 27, 2009

(54) TEST APPARATUS AND PERFORMANCE BOARD FOR DIAGNOSIS

(75) Inventor: Satoshi Iwamoto, Tokyo (JP)

(73) Assignee: Advantest Corporation, Tokyo (JP)

( * ) Notice: Subject to any disclaimer, the term of this patent is extended or adjusted under 35 U.S.C. 154(b) by 144 days.

(21) Appl. No.: 11/734,792

(22) Filed: Apr. 13, 2007

(65) Prior Publication Data

US 2008/0256408 A1 Oct. 16, 2008

(51) Int. Cl.
- G01R 31/28 (2006.01)
- G01R 31/02 (2006.01)
- G01R 31/26 (2006.01)

(52) U.S. Cl. .............. 714/734; 714/742; 714/724; 324/158.1; 324/755; 324/765

(58) Field of Classification Search .......... 714/734, 714/742, 724; 324/158.1, 755, 765
See application file for complete search history.

(56) References Cited

U.S. PATENT DOCUMENTS

| | | | | |
|---|---|---|---|---|
| 5,747,994 A * | 5/1998 | Suga | ............ | 324/158.1 |
| 6,452,411 B1 * | 9/2002 | Miller et al. | ......... | 324/765 |
| 7,174,490 B2 * | 2/2007 | Evans | ............ | 714/724 |
| 7,278,079 B2 * | 10/2007 | Evans | ............ | 714/740 |
| 7,362,089 B2 * | 4/2008 | Kushnick et al. | ...... | 324/158.1 |

FOREIGN PATENT DOCUMENTS

| WO | WO2004086071 | 10/2004 |
|---|---|---|
| WO | WO2005/114236 | * 12/2005 |

* cited by examiner

*Primary Examiner*—John J Tabone, Jr.
(74) *Attorney, Agent, or Firm*—Osha • Liang LLP

(57) ABSTRACT

A test apparatus being capable of replacing a test module with the other kind of test module that tests device under tests by using the test module is provided. The test apparatus includes a plurality of test modules that transmit/receive signals to/from the device under tests to test the device under test; and a performance board for diagnosis that diagnose the plurality of test modules. The performance board for diagnosis including: a motherboard provided common to the plurality of test, modules; a circuit for diagnosis that transmits/receives a signal to/from each test module to diagnose the test module; a plurality of inter-board to module connectors that connect between the corresponding test module and the circuit for diagnosis; and
  plurality of sub-boards each of which has at least one of the inter-board to module connectors and is fixed to the motherboard to fix the inter-board to module connectors to the motherboard.

10 Claims, 7 Drawing Sheets

TEST APPARATUS AND PERFORMANCE BOARD FOR DIAGNOSIS

BACKGROUND

1. Technical Field

The present invention relates to a test apparatus and a performance board for diagnosis. Particularly, the present invention relates to a test apparatus being capable of replacing test modules and a performance board for diagnosis used for the test apparatus.

2. Related Art

Generally, a test apparatus which employs an open-architecture method has been known as a test apparatus that tests a device under test such as a semiconductor circuit as, for example, in International Publication WO2004/086071 brochure. The open-architecture method is, for example, a method being capable of arbitrarily combining various test modules as test modules that transmit/receive signals to/from device under tests to test the device under tests.

In addition, there is a case that the test apparatus previously diagnoses whether each test module is placed in the right place and each test module appropriately operates. In order to perform such diagnosis, a performance board for diagnosis has been used as, for example, in the International Publication WO2004/086071 brochure.

The performance board, for diagnosis is provided with circuits for diagnosis that diagnose each test module by transmitting/receiving a signal to/from each test module. In addition, each performance board for diagnosis is provided with connectors that connect the test modules to the circuits for diagnosis, respectively.

However, since the open architecture method uses various test modules as described above, each connecter that connects each test module to each circuit for diagnosis has to be adapted to the test module which is used.

Here, the general performance board has been designed based on the premise that the above-described connectors are fixed onto the board. Therefore, it was required that the performance board for diagnosis be selected such that each test module used has the corresponding connector for each combination and arrangement thereof.

SUMMARY

Accordingly, it is an advantage of the invention to provide a test apparatus and a performance board for diagnosis which are capable of solving the above-mentioned problem. This advantage may be achieved through the combination of features described in independent claims of the invention. Dependent claims thereof specify preferable embodiments of the invention.

Thus, a first aspect of the present invention provides a test apparatus being capable of replacing a test module with the other kind of test module that tests a device under test by using the test module. The test apparatus includes: a plurality of test modules that transmit/receive signals to/from device under tests to test the device under tests; and a performance board for diagnosis that diagnoses the plurality of test modules. The performance board for diagnosis includes: a motherboard provided common to the plurality of test modules; a circuit for diagnosis that transmits/receives a signal to/from each, test module to diagnose the test module; a plurality of inter-board to module connectors arranged corresponding to the plurality of test modules mat connect the corresponding test modules to the circuit for diagnosis; and a plurality of sub-boards each of which includes thereon at least one of the inter-board to module connectors and is fixed to the motherboard to fix the inter-board to module connector to the motherboard.

A second aspect of the present invention provides, a test apparatus being capable of replacing a test module with, the other kind of test module that tests a device under test by using the test module, a performance board for diagnosis that diagnoses a plurality of test modules. The performance board for diagnosis includes: a motherboard provided, common to the plurality of test modules; a circuit for diagnosis that transmits/receives a signal to/from each test module to diagnose the test module; a plurality of inter-board to module connectors arranged corresponding to the plurality of test modules that connect the corresponding test modules to the circuit, for diagnosis; and a plurality of sub-boards each of which includes thereon at least one of the inter-board to module connectors and is fixed to the motherboard to fix the inter-board to module connector to the motherboard.

It is noted that the summary of the invention described above does not necessarily describe all necessary features of the invention. The invention may also be a sub-combination of the features described above.

BRIEF DESCRIPTION OF DRAWINGS

FIG. 4A shows an example of surface view of the connector unit 32; and FIG. 4B shows an example of cross-sectional view of the connector unit 32.

DESCRIPTION OF EXEMPLARY EMBODIMENTS

The invention will now be described based on preferred embodiments, which do not intend to limit the scope of the invention, but exemplify the invention. All of the features and the combinations thereof described in the embodiments are not necessarily essential to the invention.

Figure 1:
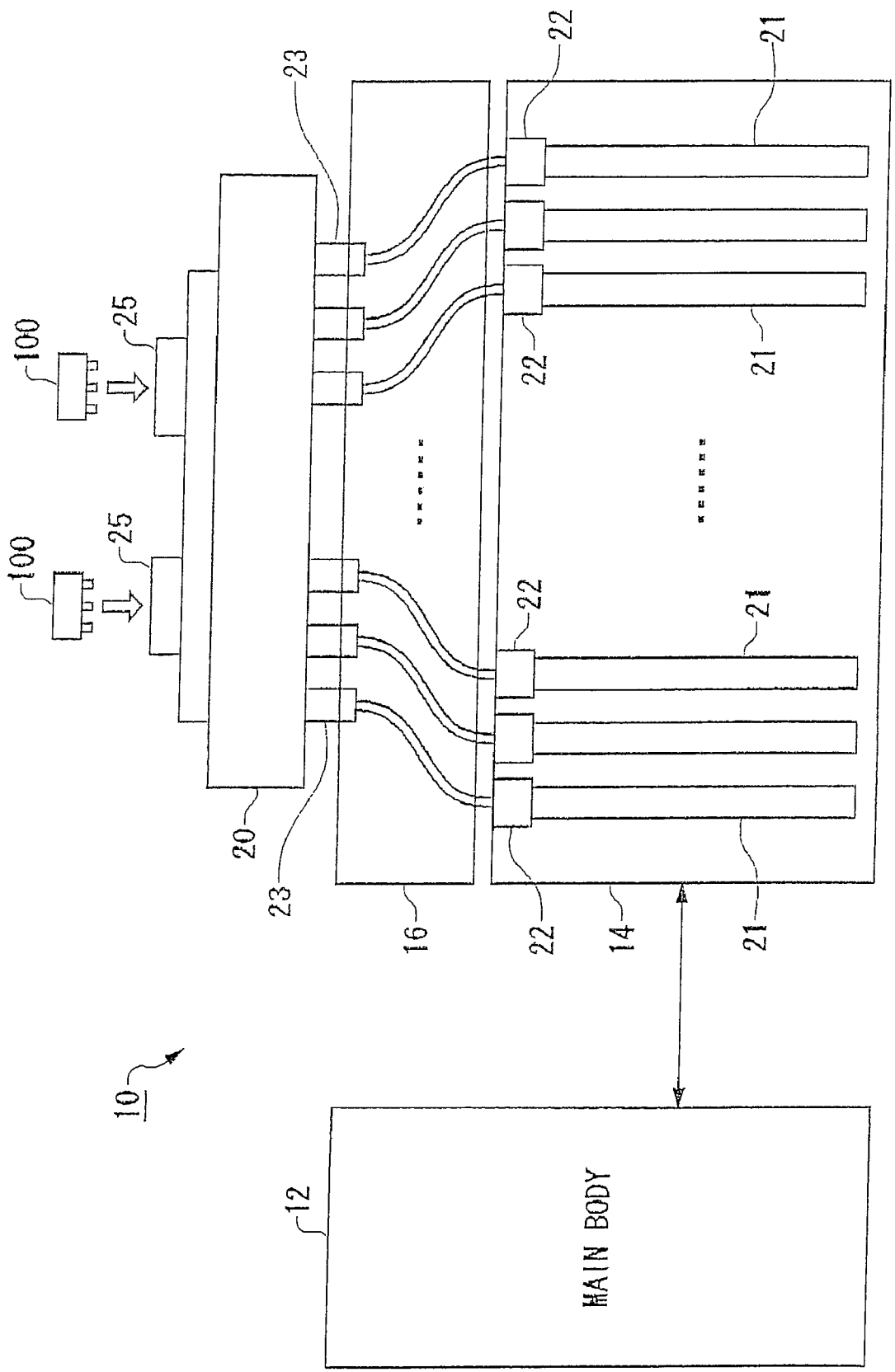
FIG. 1 slows the whole configuration of a test apparatus 10 according to an embodiment of the present invention at testing.

FIG. 1 shows the whole configuration of a test apparatus 10 according to an embodiment of the present invention at testing. Test apparatus 10 tests device under tests 100 (hereinafter referred to as DUTs 100) such as semiconductor circuits. The test apparatus 10 includes a main body 12, a test head 14 and a performance board 20. The main body 12 controls the whole of test apparatus 10, judges that the DUT passes or fails and analyzes the test result.

The test head includes therein a plurality of test modules 21 that transmit/receive signals to/from the DUTs 100. Each test module 21 is mounted on a slot 22 to be inserted into the test head 14. Thereby each test module can transmit/receive a signal to/from the DUT 100.

Each test module 21 transmits a test signal to the DUT 100 and receives an output signal from the DUT 100 which is outputted in response to the test signal. Each slot 22 is commonized with respect to a method of electrically connecting between each slot 22 and each test module 21 and a method of mechanically holding the test modules 21 so as to be able to replacing various test modules with each other. Therefore, the test modules 21 can be freely combined and recombined in the test head 14.

A test fixture 16 is provided on the test head 14. The test fixture 16 electrically and mechanically connects each slot 22 built into the test head 14 to the performance board 20. The test fixture 16 may switch connectors 22 of the performance board 20 to which each slot 22 is connected.

The performance board 20 is substantially flat, and placed on the test head 14 via the test fixture 16 while the back surface thereof is opposite to the test head 14. Back surface side connectors 23, each of which is provided at the end of the wiring extending from each test module 21, are connected to the back surface of the performance board 20.

DUT sockets 25 on which the DUTs 100 are placed are provided on the surface of the performance board 20. Each DUT socket 25 transfers a signal between each back surface side connector 23 and each DUT 100. Thereby the DUTs 100 and the test apparatus 10 are electrically connected.

The back surface connectors 23 and the DUT sockets 25 have the characteristics and the shapes adapted to the characteristic of the transmitted signal and the number of transmitted signals. For example, each back surface side connector 23 that transmits a high-frequency signal may be a connector having a good frequency characteristic. Moreover, each back surface side connector 23 that transmits an electric power may be a connector having a good pressure resistance.

By the above described feature, the test signal transmitted from each test module 21 can be provided to the appropriate terminal of the DUT 100, so that the output signal outputted from the terminal of the DUT 100 can be provided to the appropriate test module 21. Therefore, the test apparatus 10 can test in parallel a plurality of DUTs 100 placed on the performance board 20.

Figure 2:
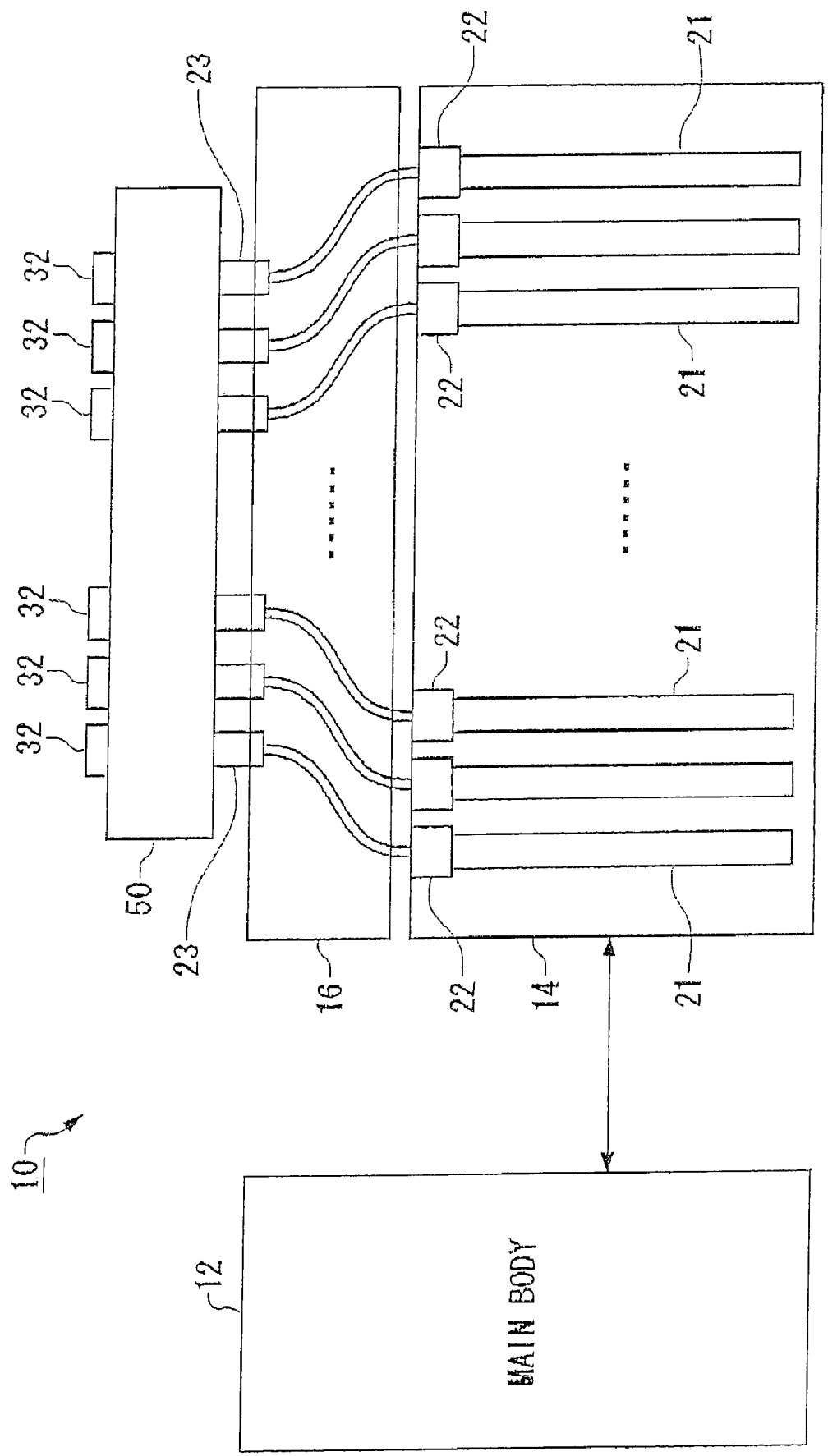
FIG. 2 shows an example of the whole configuration of the test apparatus 10 at diagnosis.

FIG. 2 shows an example of the whole configuration of the test apparatus 10 at diagnosis. The test apparatus 10 at diagnosis previously diagnoses whether each test module 21 is inserted into the appropriate slot 22, whether the test module 21 is correctly connected to the back surface side connector 23 and whether each test module 21 normally operates before testing the DUTs 100 described with reference to FIG. 1, for example.

The test apparatus 10 according to the present embodiment includes a performance board for diagnosis 50 instead of the performance board 20 of the test apparatus 10 described with reference to FIG. 1. That is, the performance board 20 and the performance board for diagnosis 50 are replaceably installed on the test apparatus 10. Here, any DUT 100 is not placed on the performance board for diagnosis 50. The performance board 50 may not have any DUT socket 25.

A plurality of connector units 32 arranged corresponding to the plurality of back surface connectors 23 are provided on the surface of the performance board for diagnosis 50. Each connector unit 32 is connected to the corresponding back surface side connector 23.

Figure 3:
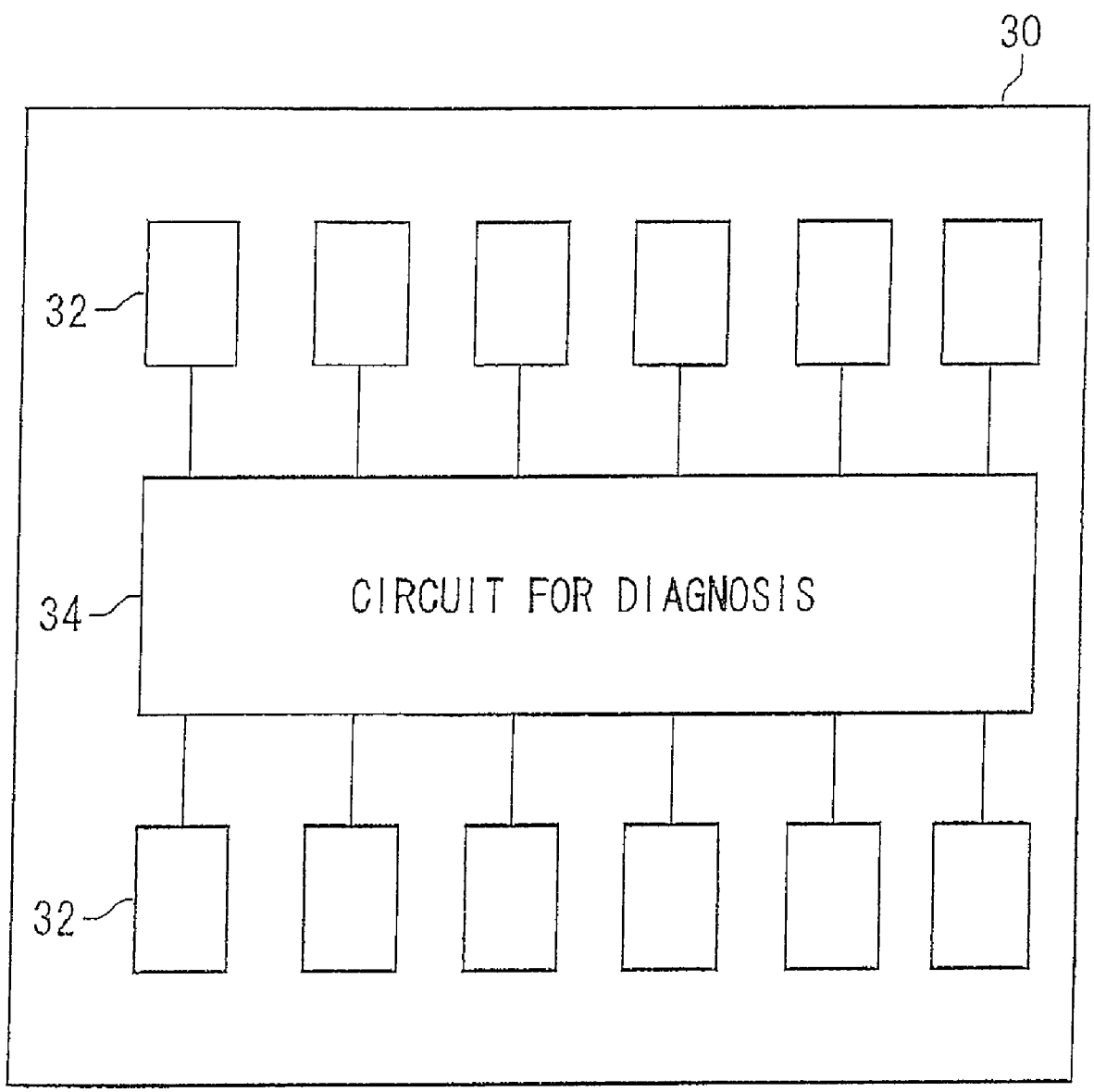
FIG. 3 shows an example of surface view of a performance board for diagnosis 50.

FIG. 3 shows an example of surface view of a performance board for diagnosis 50. The performance board 50 includes a motherboard 30, a plurality of connector units 32 and a circuit for diagnosis 34. The motherboard 30 is provided common to a plurality of test modules 21, and the circuit for diagnosis 34 is formed on the surface of the motherboard 30. In addition, wirings that electrically connect the connector units 32 and the circuit for diagnosis 34 are formed on the surface of the motherboard 30. The motherboard 30 may be such as a printed circuit board.

The circuit for diagnosis 34 transmits/receives a signal to/from each test module 21 to diagnoses each test module 21. For example, the circuit for diagnosis 34 is electrically connected to each test module 21 via the connector unit 32. Then, the circuit for diagnosis 34 may diagnose each test module 21 based on whether a predetermined response signal is returned from the test module 21 if the circuit for diagnosis 34 transmits a predetermined diagnostic signal to the test module 21.

The plurality of connector units 32 are arranged corresponding to the plurality of test modules 21. For example, the connector units 32 are arranged corresponding to the test modules one to one. Each connector unit 32 includes a connector to be connected to the corresponding back surface side connector 23. Then, the connector unit 32 is fixed to the motherboard 30, so that the connector is fixed to the motherboard 30.

Figure 4A:
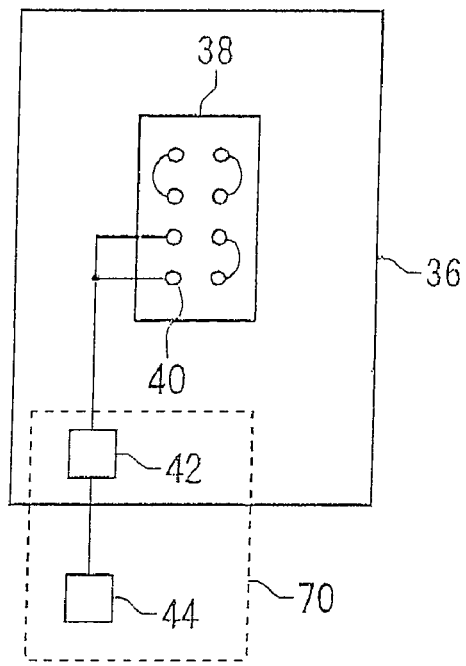
FIGS. 4A and 4B show an example of configuration of a connector unit 32.
Figure 4B:
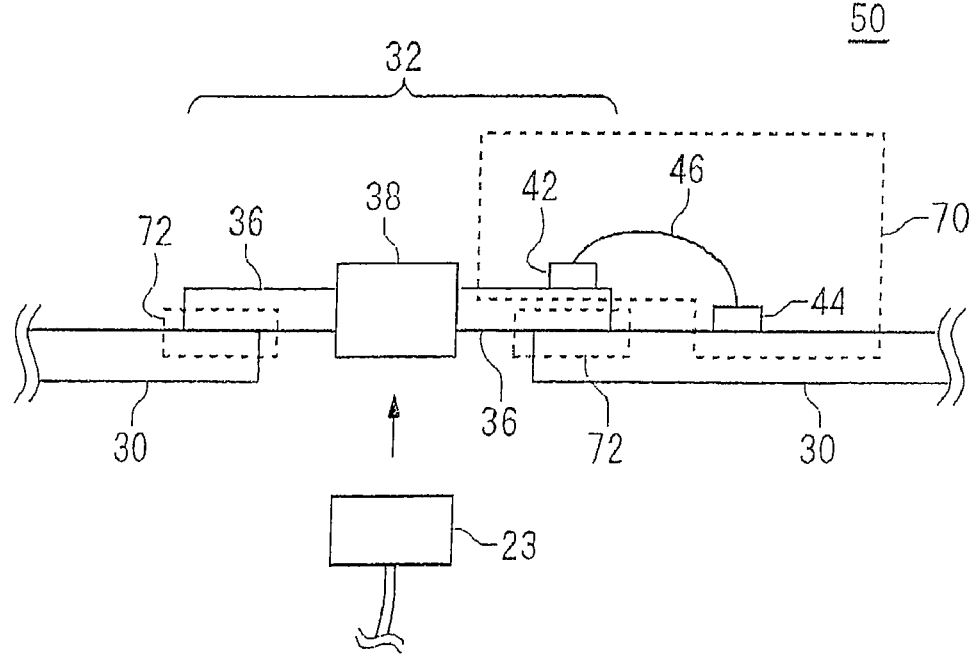

FIGS. 4A and 4B show an example of configuration of a connector unit 32: FIG. 4A shows an example of surface view of the connector unit 32; and FIG. 4B shows an example of cross-sectional view of the connector unit 32. As shown in FIG. 4A and FIG. 4B, each connector unit 32 includes a sub-board 36, an inter-board to module connector 38 (hereinafter referred to as an inter-BM connector 38 and a sub-board side connector 42.

As shown in FIG. 4B, the motherboard 30 has a through-hole on a region on which the connector unit 32 should be formed. The through-hole is formed from the first surface to the second surface of the motherboard 30. The aperture area of the through-hole is enough to pass through the back surface side connector 23. The back surface side connector 23 and the connector unit 32 are connected to each other through the through-hole.

Each of the connector units 32 is fixed to the motherboard 30 in the same structure. That is, the structure for fixing the connector units 32 to the motherboard 30 is standardized in order to any kind of connectors 32 can be installed on any installation region on which each connector unit 32 should be provided. Each connector unit 32 may include a fixing part 72 having the same structure for being fixed to the motherboard 30.

For example, each installation region on which each connector unit 32 should be provided has the same outer shape on the surface of tire motherboard 30. In addition, the sub-board 36 for each connector unit 32 may have the same outer shape each other. Then, each sub-board may fixed to the motherboard 30 in the same method each other.

Specifically, a first member for thermocompression bonding may be provided at the same portion corresponding to the fixing part 72 on each installation region on the motherboard 30. Then, a second member for thermocompression bonding may be provided on a fixing part 72 which is provided at the same position on each sub-board 36. The connector unit 32 is fixed to each installation region by thermocompression-bonding the first member and the second member. By such structure, any kind of connector unit 32 can be disposed on each installation region.

In addition, a first fitting part having the same shape may be formed on the same position corresponding to the fixing part 72 on each installation region of the motherboard 30. Moreover, a second fitting part having the same shape may be formed on the fixing part 72 disposed at the same position on each sub-board 36. Then, each connector unit 32 may be fixed to the motherboard 30 by fitting the first fitting part and the second fitting part to each other. By such structure, any kind of connector unit 32 can be installed on each installation region. In addition, the connector units 32 may be replaceably fixed to the motherboard 30.

The inter-board to module (inter-BM) connectors 38 are arranged corresponding to the plurality of test modules 21, respectively, and each of them electrically connects the corresponding test module 21 to the circuit for diagnosis 34. Each inter-BM connector 38 may have a shape, the number of pins and characteristic and so forth adapted to the corresponding test module 21. That is, each connector unit 32 may have any kind of inter-BM connector 38 different from each other. Here, the characteristic of the inter-BM connector 38 may be such as frequency characteristic and pressure resistance. Each connector unit 32 has the inter-BM connector 38 adapted to the corresponding to the test module 21, so that each connector unit 32 and each test module 21 can be electrically connected.

Each sub-board side connector 42 electrically connects the inter-BM connector 38 and the motherboard side connector 44. Each sub-board side connector 42 is provided on the surface of the sub-board 36 and connected to a pin to be connected to the circuit for diagnosis 34 among pins of the inter-BM connector 38. Each motherboard side connector 44 is provided on the surface of the motherboard 30 and connected to the circuit for diagnosis 34. In addition, the sub-board side connector 42 and the motherboard side connector 44 are connected through such as a cable 46.

Thereby each sub-board side connector 42 and each motherboard side connector 44 function as a connection part 70 that connects the sub-board 36 and the circuit for diagnosis 34. Here, each connection part 70 provided for each sub-board 36 has the same structure. For example, each sub-board side connector 42 has the same structure. Also each motherboard side connector 44 has the same structure. Here, "having the same structure" may mean that the structure of each connector has the same structure enough to allow any sub-board side connector 42 and any motherboard side connector 44 to be connected by the common cable 46.

Here, the feature of the connection part 70 is not limited to the above described feature by using the connectors. For example, both ends of the cable 46 may be soldered to the motherboard 30 and the sub-board 36. However, even if the connection part 70 has any other structure, it is preferred that each connection part 70 has the same structure so as to be able to connect any connector unit 32 to any pin of the circuit for diagnosis 34. In addition, the connection part 70 and the fixing part 72 may be provided as one section. For example, when the motherboard 30 and the sub-board 36 are soldered to each other, the soldered portion may function as the connection part 70 and the fixing part 72.

As described above, each connection part 70 has the same structure, any kind of connector unit 32 can be connected to the circuit for diagnosis 34. Therefore, any kind of test module 21 can be diagnosed by connecting the same to the circuit for diagnosis 34.

Each signal transmitted between each test module 21 and the DUT 100 has various frequencies, voltage values and current values, however, each signal transmitted between each test module 21 and the circuit for diagnosis 34 at diagnosis may not have various frequencies and so forth. For example, each diagnostic signal and response signal transmitted between each test module 21 and the circuit for diagnosis 34 can be standardized as a certain signal. Therefore, even if the structure of each connection part 70 is standardized and the electric characteristic of the connection part 70 is standardized, a signal for diagnosing each test module 21 can be accurately transmitted.

Moreover, the frequency and the voltage of a signal transmitted at the time of diagnosis are not higher than those at the time of testing. Therefore, the frequency band and the pressure resistance of the connector used in the connection part 70 may be lower than those of the connector provided between the test module 21 and the DUT 100 at the time of testing. Thus, the cost can be reduced by using such connector.

In addition, each inter-BM connector 38 may have a plurality of pins corresponding to a plurality of pins of the test module 21. Any pin of the inter-BM connector 38 may be connected to the other pin. In this case, the circuit for diagnosis 34 can loop the signal outputted from the test module 21 back to the test module 21 to diagnose the test module 21. In addition, any pin of the inter-BM connector 38 is connected to the circuit for diagnosis 34 through the connection part 70 as described above.

The circuit for diagnosis 34 may input a predetermined diagnostic signal to each, test module 21 through each connector unit 32. Receiving the diagnostic signal, the test module 21 may output a predetermined response signal. The circuit for diagnosis 34 may receive the response signal through the connector unit 32 and diagnose the test module 21 based on the response signal.

For example, the circuit for diagnosis 34 may sequentially input diagnostic signals to each connector unit 32. Then, the test module 21 may output the response signal containing the self-identification information in response to the diagnostic signal. The circuit for diagnosis 34 may diagnose whether the appropriate test module 21 is inserted into each slot 22 based on the identification information sequentially received. In addition, the circuit for diagnosis 34 may further diagnose whether the appropriate inter-BM connector 38 is inserted into each position of the motherboard 30. In this case, each connector unit 32 may previously store identification information for identifying the own inter-BM connector and output the identification information to the circuit for diagnosis 34 in response to the diagnostic signal.

Figure 5:
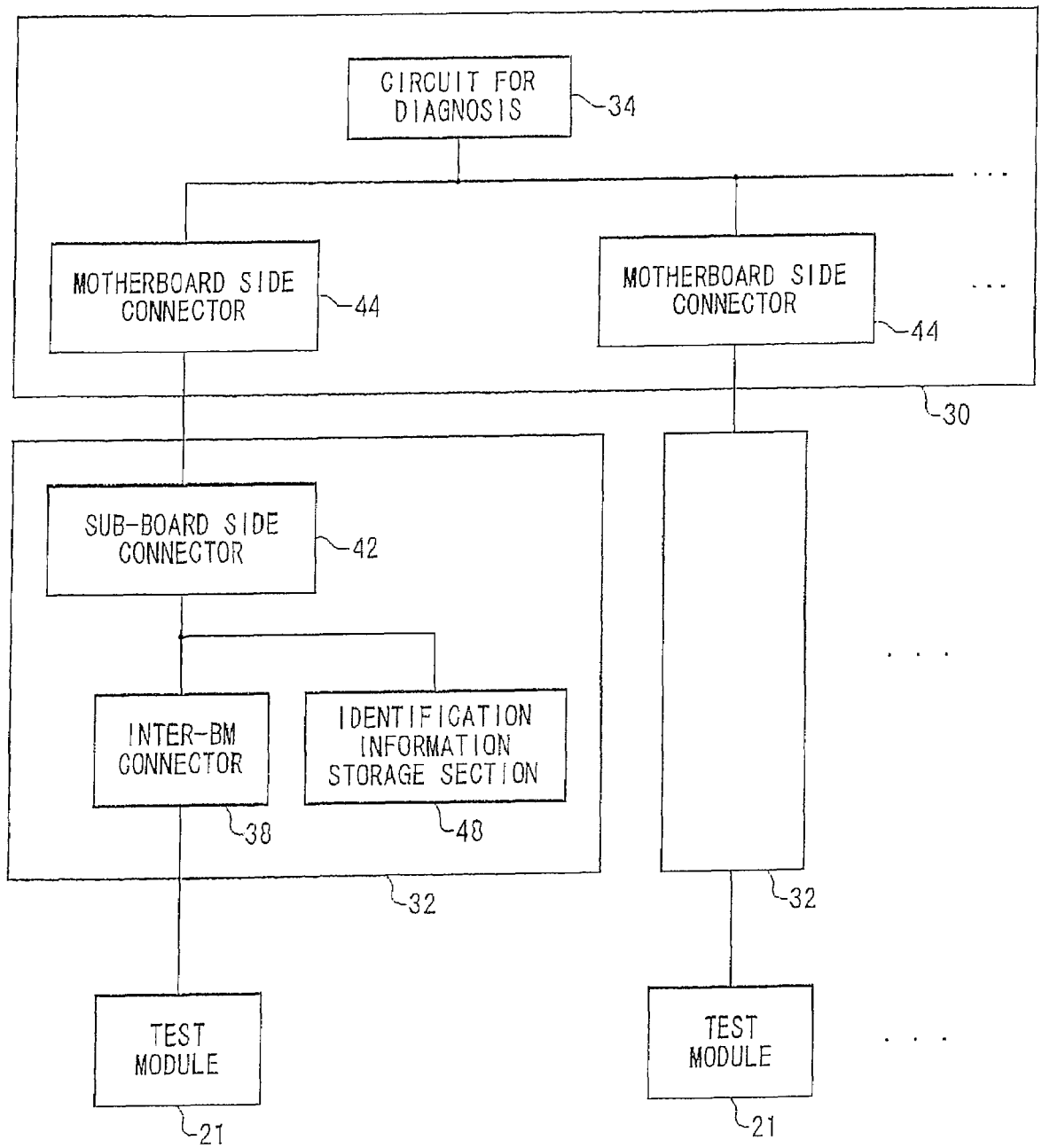
FIG. 5 is a block diagram showing an example of functional configuration of the performance board for diagnosis 50.

FIG. 5 is a block diagram showing an example of functional configuration of the performance board for diagnosis 50. The performance board 50, as described above, includes the motherboard 30 and a plurality of connector units 32 and diagnoses a plurality of test modules 21.

The motherboard 30 is shared by the plurality of test modules 21. In addition, the motherboard 30 includes a plurality of motherboard side connectors 44 corresponding to the plurality of test modules 21 and the common circuit for diagnosis 34.

The circuit for diagnosis 34 transmits/receives a signal to/from each test module 21 to diagnose the test module 21. The plurality of motherboard side connector 44 are arranged corresponding to the plurality of connector units 32 one to one on the motherboard 30, and each of the motherboard side connector 44 connects the corresponding sub-board side connector 42 and the circuit for diagnosis 34.

Each of the connector unit 32 includes the sub-board 36 (cf. FIG. 4), the sub-board side connector 42, the inter-BM connector 38 and an identification information storage section 48. The sub-board side connector 42 connects between toe motherboard side connector 44 and the inter-BM connector 38.

The inter-BM connector 38 connects between the corresponding test module 21 and the sub-board side connector 42. By such feature, the circuit for diagnosis 34 and each test module 21 are connected to each other. The identification information storage section 48 may store identification information for identifying the corresponding inter-BM connector 38. The identification information may indicate the kind of inter-BM connector 38, and also may indicate the kind of test module 21 to which the inter BM connector 38 should be connected.

The identification information storage section 48 may split a diagnostic signal from the circuit for diagnosis 34 to the test module 21, receive the same and return a response signal containing the identification information to the circuit for diagnosis 34 in response to the diagnostic signal. Thereby the circuit for diagnosis 34 can diagnose whether the appropriate connector unit 32 is connected to each motherboard connector 44.

In addition, the circuit for diagnosis 34, as described above, may further receive the identification information of the test module 21. Thereby the circuit for diagnosis 34 can diagnose whether the appropriate test module 21 is inserted into each slot 22. Moreover the circuit for diagnosis 34 can diagnose cases that both of the connector unit 32 and the test module 21 are not appropriately provided, and that either the connector unit 32 or the test module 21 is not appropriately provided.

Figure 6:
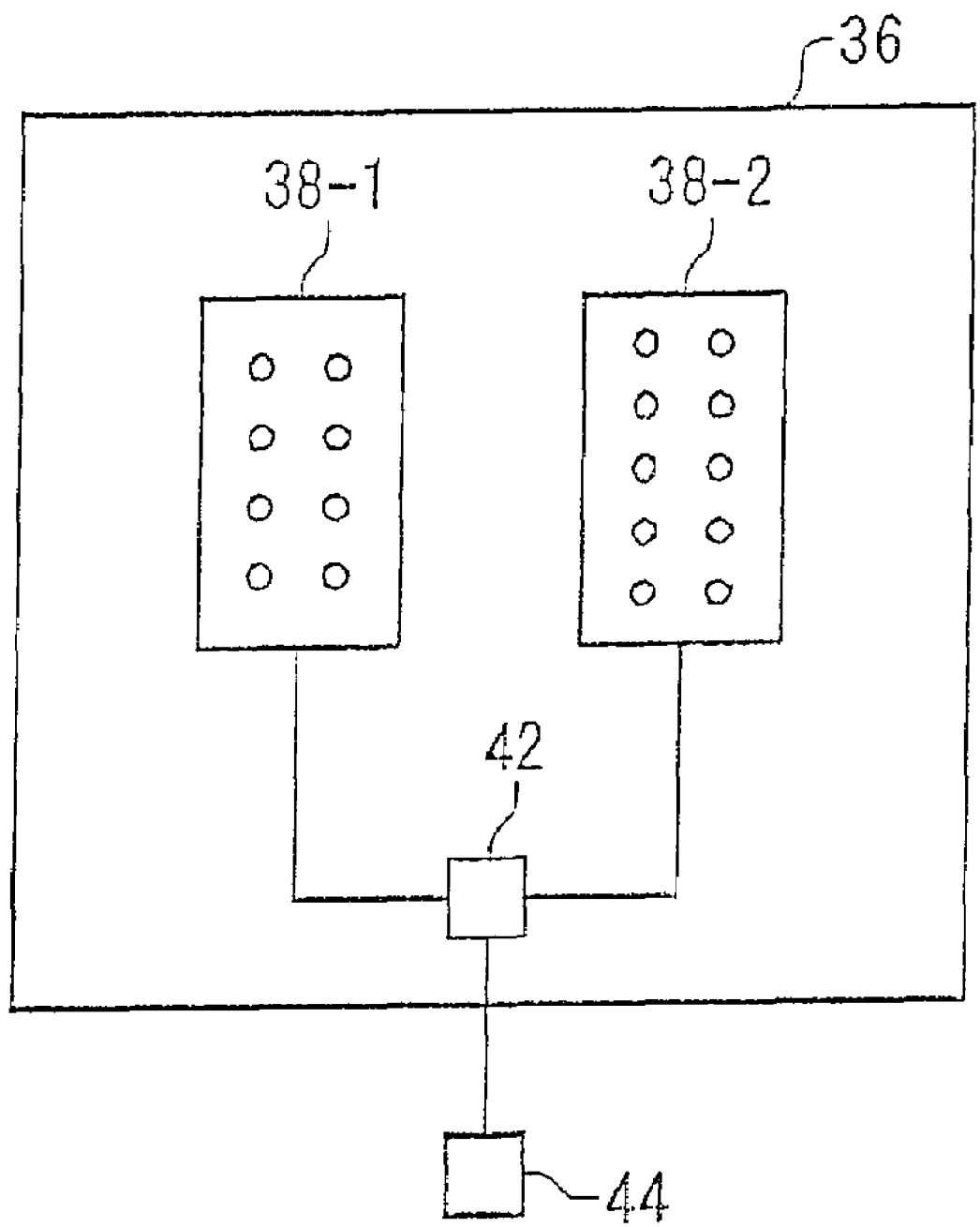
FIG. 6 shows another example of configuration of the connector unit 32.

FIG. 6 show another example of configuration of the connector unit 32. The connector unit 32 according to the present embodiment is different from the connector unit 32 described with reference to FIG. 2-FIG. 5 regarding having a plurality of inter-BM connectors 38. The other features may be the same as those of the connector unit 32 described with reference to FIG. 2-FIG. 5.

The plurality of inter-BM connectors may be the same connectors but may be connector's different from each other. The word "the different connectors" means connectors having the number of pins, the frequency characteristic and the pressure resistance which are different from each other. The connector unit 32 may be connected to one test module 21 by the plurality of inter-BM connectors 38, and also may be connected to a plurality of test, module 21. The performance board for diagnosis 50 may include both of the connector unit 32 having one inter-BM connector 38 and the connector unit 32 having the plurality of inter-BM connectors 38 at the same time.

Figure 7:
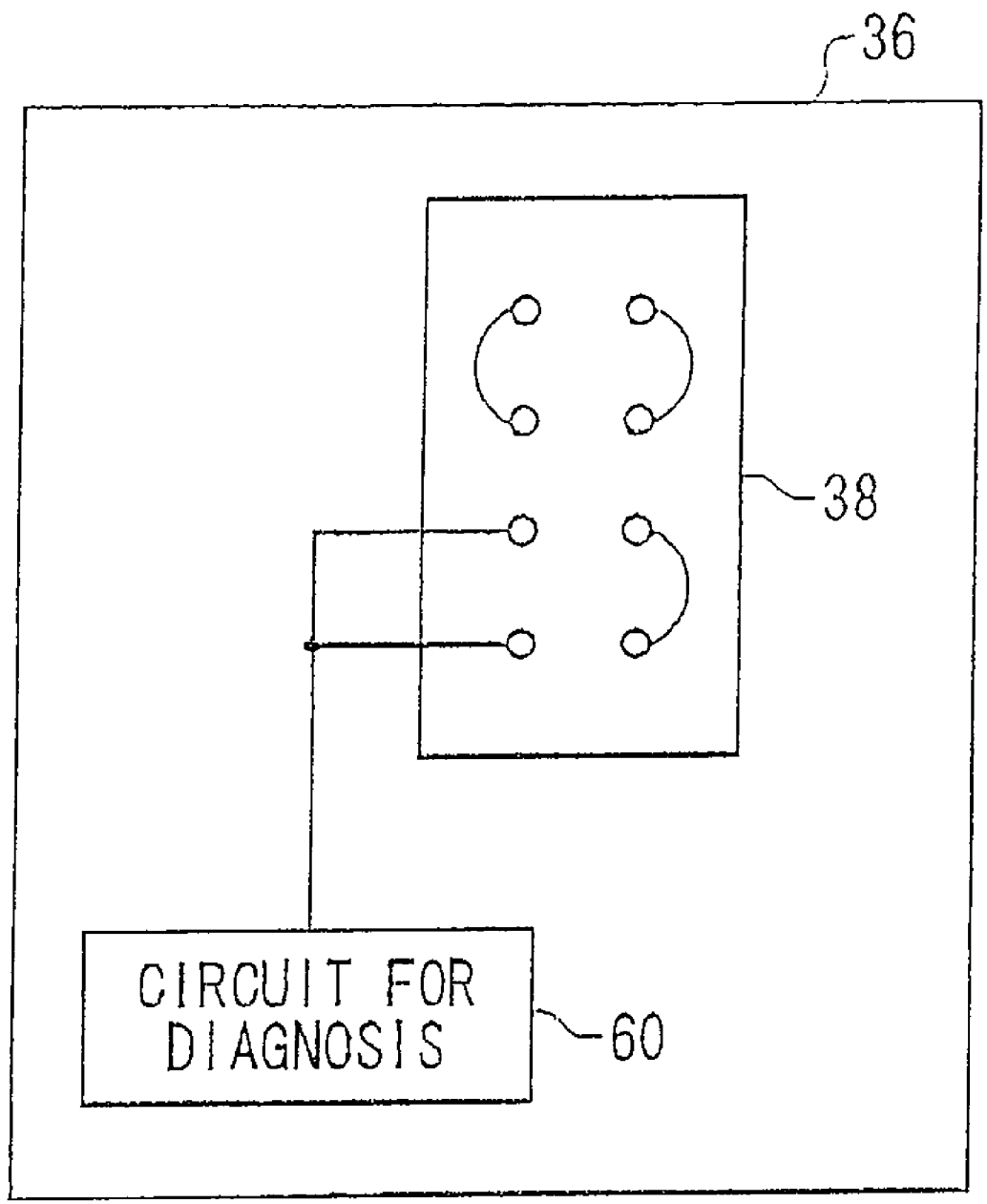
FIG. 7 shows another example of configuration of the connector unit 32.

FIG. 7 shows another example of configuration of the connector unit 32. The connector unit 32 according to the present embodiment further includes a circuit for diagnosis 60 in addition to the components of the connector unit 32 described with reference to FIG. 2-FIG. 6.

The circuit for diagnosis 60 and a predetermined, pin of the inter-BM connector 38 are electrically connected within each connector unit 32. Therefore, the connector unit 32 may not need the sub-board side connector 42. In addition, the motherboard 30 may not need the motherboard side connector 44.

Each circuit for diagnosis 60 diagnoses the test module 21 connected to each, sub-board 36. The circuit for diagnosis 60 may have the function the same as that of the circuit for diagnosis 34 described with reference to FIG. 2-FIG. 6. Each circuit for diagnosis 60 independently operates for each sub-board 36 to diagnoses the corresponding test module 21.

Here, the fixing part 72 (cf. FIG. 4) in each sub-board 36 also has the same structure each other in the present embodiment, By such feature, the performance board for diagnosis 50 corresponding to the test modules used can be easily prepared.

Moreover, as described with reference to FIG. 3, when the common circuit 34 for diagnosis is provided on the motherboard 30, a trigger signal for causing the circuit for diagnosis 34 to start a diagnosis may be provided from any test module 21. The circuit for diagnosis 34 may diagnose each test module 21 in response to the trigger signal. In addition, any test module 21 may provide an electric power for the circuit for diagnosis 34.

Meanwhile, as described with reference to FIG. 7, when an individual circuit for diagnosis 34 is provided for each connector unit 32, the trigger signal may be provided from each test module 21 to each circuit for diagnosis 34. Each circuit for diagnosis 34 may diagnose the corresponding test module 21 in response to the trigger signal. In addition, the electric power of the circuit for diagnosis 60 may be provided from the corresponding test module 21. That is, each connector unit 32 is not electrically connected to the other connector unit 32 or the motherboard 30, therefore, any connector unit 32 can be disposed at any position of the motherboard 30 provided that the mechanical connection method between each connector unit 32 and the motherboard 30 is unified.

While the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

As described above, according to the present embodiment, a performance board for diagnosis that diagnoses test modules can be easily prepared in a test apparatus being capable of replacing the test modules with each other.

What is claimed is:

1. A test apparatus, configured such that a test module is replaceable with another kind of test module, that tests a device under test using the test module, comprising:

a plurality of test modules, including the test module and the another kind of test module, that transmit/receive signals to/from the device under test to test the device under test; and a performance board for diagnosis that diagnoses the plurality of test modules, the performance board for diagnosis including:

a motherboard provided common to the plurality of test modules;

a circuit for diagnosis that transmits/receives a signal to/from each of the plurality of test modules to diagnose the plurality of test modules;

a plurality of inter-board to module connectors arranged corresponding to the plurality of test modules, each of which connects the corresponding test module to the circuit for diagnosis; and a plurality of sub-boards each of which includes thereon at least one of the plurality of inter-board to module connectors and is replaceably fixed to the motherboard to fix the at least one of the plurality of inter-board to module connectors to the motherboard, wherein each of the plurality of sub-boards has a fixing part which replaceably fixes each of the plurality of sub-boards to the motherboard, and wherein each fixing part has substantially the same structure.

2. The test apparatus as set forth in claim 1, wherein the circuit for diagnosis is provided on the motherboard and diagnoses the plurality of test modules, respectively.

3. The test apparatus as set forth in claim 2, wherein the performance board for diagnosis has a plurality of connection parts that connect each of the plurality of sub-boards to the circuit for diagnosis, each of the plurality of connection parts having the same structure.

4. The test apparatus as set forth in claim 3, wherein the the plurality of connection parts include:

a plurality of sub-board side connectors each of which is provided for one of the plurality of sub-boards and connected to one of the plurality of inter-board to module connectors; and a plurality of motherboard side connectors arranged corresponding to the plurality of sub-boards one to one on the motherboard, each of which connects the sub-board side connector for which the corresponding sub-board is provided to the circuit for diagnosis.

5. The test apparatus as set forth in claim 4, wherein each of the plurality of inter-board to module connectors is designed so as to be electrically connectable to the corresponding test module, and each of the plurality of sub-board side connectors has the same structure.

6. The test apparatus as set forth in claim 5, wherein each of the plurality of motherboard side connectors has the same structure.

7. The test apparatus as set forth in claim 1, wherein the performance board for diagnosis includes a plurality of circuits for diagnosis, each of which is provided on one of the plurality of sub-boards and diagnoses the test module connected to the sub-board.

8. The test apparatus as set forth in claim 7, wherein each of the plurality of circuits for diagnosis independently operates for the sub-board.

9. The test apparatus as set forth in claim 2, wherein each of the plurality of sub-boards further includes an identification information storage section that previously stores identification information for identifying the at least one of the plurality of inter-board to module connectors and notifies the circuit for diagnosis of the identification information.

10. In a test apparatus, configured such that test module is replaceable with another kind of test module, that tests a device under test by using the test module, a performance board for diagnosis that diagnoses a plurality of test modules including the test module and the another kind of test module, the performance board for diagnosis comprising:

a motherboard provided common to the plurality of test modules;

a circuit for diagnosis that transmits/receives a signal to/from each of the plurality of test modules to diagnose the plurality of test modules;

a plurality of inter-board to module connectors arranged corresponding to the plurality of test modules, each of which connects the corresponding test module to the circuit for diagnosis; and a plurality of sub-boards each of which includes thereon at least one of the plurality of inter-board to module connectors and is replaceably fixed to the motherboard to fix the at least one of the plurality of inter-board to module connectors to the motherboard, wherein each of the plurality of sub-boards has a fixing part which replaceably fixes the each of the plurality of sub-boards to the motherboard, and wherein each fixing part has substantially the same structure.

* * * * *